United States Patent
Patel et al.

(10) Patent No.: US 11,301,327 B2
(45) Date of Patent: Apr. 12, 2022

(54) METHOD AND SYSTEM FOR MANAGING A SPARE PERSISTENT STORAGE DEVICE AND A SPARE NODE IN A MULTI-NODE DATA CLUSTER

(71) Applicant: Dell Products L.P., Hopkinton, MA (US)

(72) Inventors: Dharmesh M. Patel, Round Rock, TX (US); Rizwan Ali, Cedar Park, TX (US); Ravikanth Chaganti, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 106 days.

(21) Appl. No.: 16/810,955

(22) Filed: Mar. 6, 2020

(65) Prior Publication Data

US 2021/0279137 A1    Sep. 9, 2021

(51) Int. Cl.
| | |
|---|---|
| *G06F 11/10* | (2006.01) |
| *G06F 11/16* | (2006.01) |
| *G06F 11/07* | (2006.01) |
| *G06F 11/14* | (2006.01) |
| *G06F 11/30* | (2006.01) |

(52) U.S. Cl.
CPC ...... *G06F 11/1092* (2013.01); *G06F 11/0772* (2013.01); *G06F 11/1435* (2013.01); *G06F 11/1658* (2013.01); *G06F 11/3034* (2013.01)

(58) Field of Classification Search
CPC ............ G06F 11/1092; G06F 11/0772; G06F 11/1435; G06F 11/1658; G06F 11/3034
See application file for complete search history.

(56) References Cited

U.S. PATENT DOCUMENTS

| | | | |
|---|---|---|---|
| 4,780,809 A | 10/1988 | Woffinden et al. | |
| 5,689,678 A | 11/1997 | Stallmo et al. | |
| 6,098,098 A | 8/2000 | Sandahl et al. | |
| 6,223,252 B1 * | 4/2001 | Bandera ............. | G06F 11/2069 711/112 |
| 6,516,425 B1 * | 2/2003 | Belhadj ............... | G06F 11/1092 714/15 |
| 7,636,814 B1 | 12/2009 | Karr et al. | |
| 7,882,386 B1 | 2/2011 | Potnis et al. | |
| 7,987,353 B2 | 7/2011 | Holdaway et al. | |

(Continued)

FOREIGN PATENT DOCUMENTS

| | | | | |
|---|---|---|---|---|
| WO | 2015114643 A1 | 8/2015 | | |
| WO | WO-2015114643 A1 * | 8/2015 | .......... | G06F 11/1092 |

OTHER PUBLICATIONS

"Make more time for the work that matters most"; Asana, Inc.; 2017 (https://asana.com/) (7 pages).

(Continued)

*Primary Examiner* — Matthew M Kim
*Assistant Examiner* — Indranil Chowdhury
(74) *Attorney, Agent, or Firm* — Chamberlain, Hrdlicka, White, Williams & Aughtry

(57) ABSTRACT

In general, the invention relates to a method for managing data. The method includes detecting a failure of a persistent storage device in a data node of a plurality of data nodes, and in response to the detecting, initiating a rebuilding of data in a spare location using proactive copy metadata and slice metadata, wherein the data is a copy of data that was stored in the persistent storage device.

17 Claims, 13 Drawing Sheets

(56) References Cited

U.S. PATENT DOCUMENTS

| | | |
|---|---|---|
| 8,037,345 B1* | 10/2011 | Iyer .................. G06F 11/2094 714/6.12 |
| 8,099,571 B1 | 1/2012 | Driscoll et al. |
| 8,161,255 B2 | 4/2012 | Anglin et al. |
| 8,190,835 B1 | 5/2012 | Yueh |
| 8,364,917 B2 | 1/2013 | Bricker et al. |
| 8,386,930 B2 | 2/2013 | Dillenberger et al. |
| 8,583,769 B1 | 11/2013 | Peters et al. |
| 8,788,466 B2 | 7/2014 | Anglin et al. |
| 8,868,987 B2 | 10/2014 | Wagner |
| 8,874,892 B1 | 10/2014 | Chan et al. |
| 8,898,114 B1 | 11/2014 | Feathergill et al. |
| 8,949,208 B1 | 2/2015 | Xu et al. |
| 9,122,501 B1 | 9/2015 | Hsu et al. |
| 9,176,679 B2 | 11/2015 | Oberhofer et al. |
| 9,201,751 B1 | 12/2015 | Muthirisavenugopal et al. |
| 9,256,381 B1 | 2/2016 | Fultz et al. |
| 9,278,481 B2 | 3/2016 | Hull |
| 9,355,036 B2 | 5/2016 | Beard et al. |
| 9,521,198 B1 | 12/2016 | Agarwala et al. |
| 9,710,367 B1 | 7/2017 | Nagineni |
| 9,749,480 B1 | 8/2017 | Katano |
| 9,830,111 B1 | 11/2017 | Patiejunas et al. |
| 9,898,224 B1 | 2/2018 | Marshak et al. |
| 10,002,048 B2 | 6/2018 | Chennamsetty et al. |
| 10,013,323 B1* | 7/2018 | Puhov ................ G06F 11/1076 |
| 10,013,325 B1* | 7/2018 | Garrett, Jr. .......... G06F 11/0793 |
| 10,031,672 B2 | 7/2018 | Wang et al. |
| 10,057,184 B1 | 8/2018 | Prahlad et al. |
| 10,091,295 B1 | 10/2018 | Savic et al. |
| 10,097,620 B2 | 10/2018 | Reddy et al. |
| 10,152,254 B1* | 12/2018 | Kang .................. G06F 3/0647 |
| 10,185,624 B2 | 1/2019 | Akutsu et al. |
| 10,241,695 B2 | 3/2019 | Baptist et al. |
| 10,339,455 B1 | 7/2019 | Parush-Tzur et al. |
| 10,353,596 B2 | 7/2019 | Zhou |
| 10,409,778 B1 | 9/2019 | Zhao et al. |
| 10,452,301 B1 | 10/2019 | Farhan |
| 10,503,413 B1 | 12/2019 | Gal et al. |
| 10,503,611 B1 | 12/2019 | Srivastav et al. |
| 10,528,429 B1* | 1/2020 | Vempati .............. G06F 11/1435 |
| 10,817,392 B1* | 10/2020 | McAuliffe ........... G06F 11/1461 |
| 10,929,256 B2* | 2/2021 | Danilov .............. G06F 11/2094 |
| 10,990,480 B1* | 4/2021 | Bernat ................. G06F 3/0685 |
| 11,005,468 B1* | 5/2021 | Subramanian ........ H03L 7/0814 |
| 11,112,990 B1* | 9/2021 | Bernat ................. G06F 3/0647 |
| 2001/0044879 A1 | 11/2001 | Moulton et al. |
| 2003/0036882 A1* | 2/2003 | Harper ................ G06F 11/2035 702/186 |
| 2003/0058277 A1 | 3/2003 | Bowman-Amuah |
| 2003/0065873 A1 | 4/2003 | Collins et al. |
| 2003/0172145 A1 | 9/2003 | Nguyen |
| 2003/0177205 A1 | 9/2003 | Liang et al. |
| 2004/0128587 A1 | 7/2004 | Kenchammana-Hosekote et al. |
| 2004/0153844 A1* | 8/2004 | Ghose .................. H04L 41/064 714/42 |
| 2004/0260967 A1* | 12/2004 | Guha .................. G06F 11/1084 714/3 |
| 2005/0076049 A1 | 4/2005 | Qubti et al. |
| 2005/0086557 A1 | 4/2005 | Sato et al. |
| 2005/0182797 A1 | 8/2005 | Adkins et al. |
| 2005/0262385 A1* | 11/2005 | McNeill .............. G06F 11/008 714/6.2 |
| 2005/0283655 A1* | 12/2005 | Ashmore ............. G06F 11/2094 714/6.32 |
| 2007/0214255 A1* | 9/2007 | Spitz .................. H04L 41/0803 709/224 |
| 2007/0283011 A1 | 12/2007 | Rakowski et al. |
| 2008/0244204 A1 | 10/2008 | Cremelie et al. |
| 2009/0077165 A1 | 3/2009 | Rhodes et al. |
| 2009/0094250 A1 | 4/2009 | Dhuse et al. |
| 2009/0235022 A1 | 9/2009 | Bates et al. |
| 2009/0265360 A1 | 10/2009 | Bachwani et al. |
| 2010/0061207 A1* | 3/2010 | Trantham .............. G11B 27/36 369/53.1 |
| 2010/0138604 A1 | 6/2010 | Noguchi et al. |
| 2011/0099351 A1 | 4/2011 | Condict |
| 2011/0173484 A1* | 7/2011 | Schuette ............... G11C 29/52 714/2 |
| 2011/0197024 A1 | 8/2011 | Thomas |
| 2011/0246597 A1 | 10/2011 | Swanson et al. |
| 2012/0096309 A1* | 4/2012 | Kumar ................. G06F 11/00 714/6.22 |
| 2013/0047029 A1 | 2/2013 | Ikeuchi et al. |
| 2013/0067459 A1 | 3/2013 | Sannidhanam et al. |
| 2013/0086006 A1 | 4/2013 | Colgrove |
| 2013/0151683 A1 | 6/2013 | Jain et al. |
| 2013/0339818 A1 | 12/2013 | Baker et al. |
| 2014/0020083 A1 | 1/2014 | Fetik |
| 2014/0032834 A1* | 1/2014 | Cudak ................. G06F 11/1092 711/114 |
| 2014/0059311 A1 | 2/2014 | Oberhofer et al. |
| 2014/0089265 A1 | 3/2014 | Talagala et al. |
| 2014/0089630 A1 | 3/2014 | Pignatelli |
| 2014/0285917 A1* | 9/2014 | Cudak ................. G11B 20/1889 360/49 |
| 2014/0297603 A1 | 10/2014 | Kim et al. |
| 2015/0012775 A1 | 1/2015 | Cudak et al. |
| 2015/0046756 A1* | 2/2015 | Sreekumaran ........ G06F 11/008 714/47.2 |
| 2015/0058582 A1 | 2/2015 | Baldwin et al. |
| 2015/0095596 A1 | 4/2015 | Yang |
| 2015/0161000 A1 | 6/2015 | Kim et al. |
| 2015/0205657 A1* | 7/2015 | Clark .................. G06F 11/008 714/47.3 |
| 2015/0205669 A1* | 7/2015 | Sundaram ............. G06F 3/0689 714/6.23 |
| 2015/0220400 A1 | 8/2015 | Resch et al. |
| 2015/0227602 A1 | 8/2015 | Ramu et al. |
| 2015/0286545 A1 | 10/2015 | Brown |
| 2015/0355980 A1 | 12/2015 | Volvovski et al. |
| 2016/0062674 A1 | 3/2016 | Benight et al. |
| 2016/0070652 A1 | 3/2016 | Sundararaman et al. |
| 2016/0077933 A1 | 3/2016 | Ventura et al. |
| 2016/0085630 A1 | 3/2016 | Gardner |
| 2016/0246537 A1 | 8/2016 | Kim |
| 2017/0090767 A1* | 3/2017 | Poston .................. G06F 11/16 |
| 2017/0099187 A1 | 4/2017 | Dale et al. |
| 2017/0147437 A1* | 5/2017 | Borlick ............... G11C 29/50012 |
| 2017/0160983 A1 | 6/2017 | Fiske et al. |
| 2017/0192865 A1* | 7/2017 | Pan .................... G06F 3/0619 |
| 2017/0192868 A1 | 7/2017 | Vijayan et al. |
| 2017/0206034 A1 | 7/2017 | Fetik |
| 2017/0235609 A1 | 8/2017 | Wires et al. |
| 2017/0308436 A1* | 10/2017 | Agombar ............. G06F 11/1666 |
| 2018/0018227 A1 | 1/2018 | Kazi |
| 2018/0018235 A1 | 1/2018 | Arslan et al. |
| 2018/0060894 A1 | 3/2018 | Beveridge et al. |
| 2018/0157532 A1 | 6/2018 | Kumar et al. |
| 2018/0165169 A1 | 6/2018 | Camp et al. |
| 2018/0189109 A1 | 7/2018 | Nagai et al. |
| 2018/0217898 A1 | 8/2018 | Tormasov |
| 2018/0260123 A1 | 9/2018 | Andresen et al. |
| 2018/0278597 A1 | 9/2018 | Helms et al. |
| 2018/0307560 A1 | 10/2018 | Vishnumolakala et al. |
| 2018/0314607 A1* | 11/2018 | Deshpande ........... G06F 16/28 |
| 2018/0322558 A1 | 11/2018 | Padmanabh et al. |
| 2018/0356998 A1 | 12/2018 | Wu et al. |
| 2019/0050263 A1 | 2/2019 | Patel et al. |
| 2019/0104398 A1 | 4/2019 | Owen et al. |
| 2019/0108099 A1 | 4/2019 | Mazumdar |
| 2019/0109772 A1 | 4/2019 | Lipstone et al. |
| 2019/0197023 A1 | 6/2019 | Chennamsetty et al. |
| 2019/0332473 A1 | 10/2019 | Yang et al. |
| 2019/0332502 A1* | 10/2019 | Ma ...................... G06F 3/0644 |
| 2019/0361850 A1 | 11/2019 | Uno et al. |
| 2019/0379588 A1 | 12/2019 | Rao |
| 2020/0026439 A1* | 1/2020 | Gao .................... G06F 3/0611 |
| 2020/0034257 A1 | 1/2020 | Mahmood et al. |
| 2020/0042388 A1* | 2/2020 | Roberts ............... G06F 11/1088 |
| 2020/0050689 A1 | 2/2020 | Tal et al. |

(56) References Cited

U.S. PATENT DOCUMENTS

| | | |
|---|---|---|
| 2020/0065191 A1 | 2/2020 | Zhou |
| 2020/0133503 A1 | 4/2020 | Sun et al. |
| 2020/0257457 A1 | 8/2020 | Matsugami et al. |

OTHER PUBLICATIONS

Extended European Search Report issued in corresponding European Application No. 20152194.5, dated Jun. 29, 2020 (10 pages).
Extended European Search Report issued in corresponding European Application No. 20152195.2, dated Jun. 2, 2020 (6 pages).
Suzhen Wu et al. ;"Improving Reliability of Deduplication-based Storage Systems with Per-File Parity"; 2018 IEEE 37th International Symposium on Reliable Distributed Systems (SRDS); Salvador, Brazil; 2018; pp. 171-180 (DOI:10.1109/SRDS.2018.00028) (10 pages).

* cited by examiner

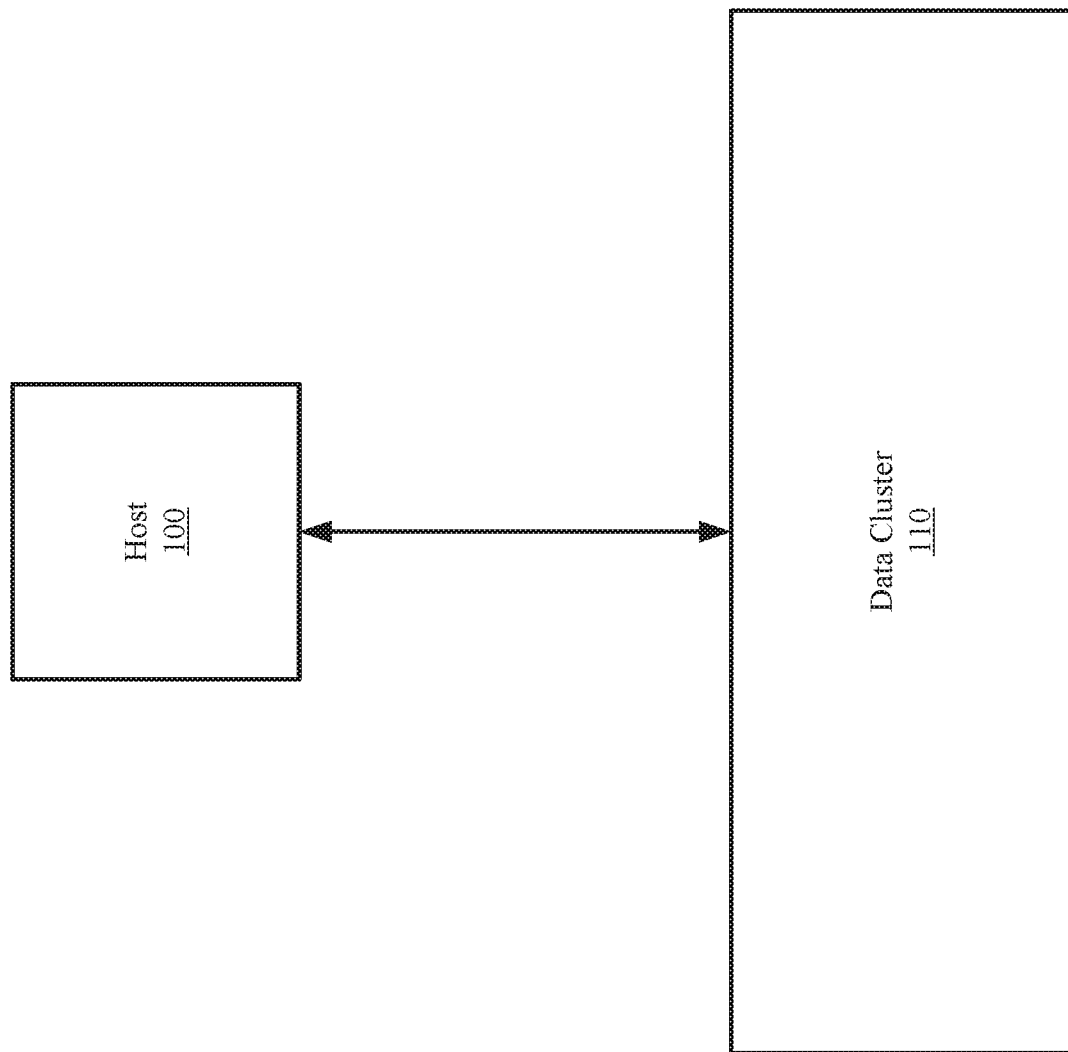

METHOD AND SYSTEM FOR MANAGING A SPARE PERSISTENT STORAGE DEVICE AND A SPARE NODE IN A MULTI-NODE DATA CLUSTER

BACKGROUND

Computing devices may include any number of internal components such as processors, memory, and persistent storage. Each of the internal components of a computing device may be used to generate data. The process of generating and storing data may utilize computing resources of the computing devices such as processing and storage.

SUMMARY

In general, in one aspect, the invention relates to a method for managing data. The method includes detecting a failure of a persistent storage device in a data node of a plurality of data nodes, and in response to the detecting, initiating a rebuilding of data in a spare location using proactive copy metadata and slice metadata, wherein the data is a copy of data that was stored in the persistent storage device.

In general, in one aspect, the invention relates to a system that includes a processor and data processor, which when executed by the processor performs a method. The method comprises detecting a failure of a persistent storage device in a data node of a plurality of data nodes, and in response to the detecting, initiating a rebuilding of data in a spare location using proactive copy metadata and slice metadata, wherein the data is a copy of data that was stored in the persistent storage device.

In general, in one aspect, the invention relates to a non-transitory computer readable medium which includes computer readable program code, which when executed by a computer processor enables the computer processor to perform a method. The method includes detecting a failure of a persistent storage device in a data node of a plurality of data nodes, and in response to the detecting, initiating a rebuilding of data in a spare location using proactive copy metadata and slice metadata, wherein the data is a copy of data that was stored in the persistent storage device.

BRIEF DESCRIPTION OF DRAWINGS

FIG. 1A shows a diagram of a system in accordance with one or more embodiments of the invention.

DETAILED DESCRIPTION

Figure 1B:
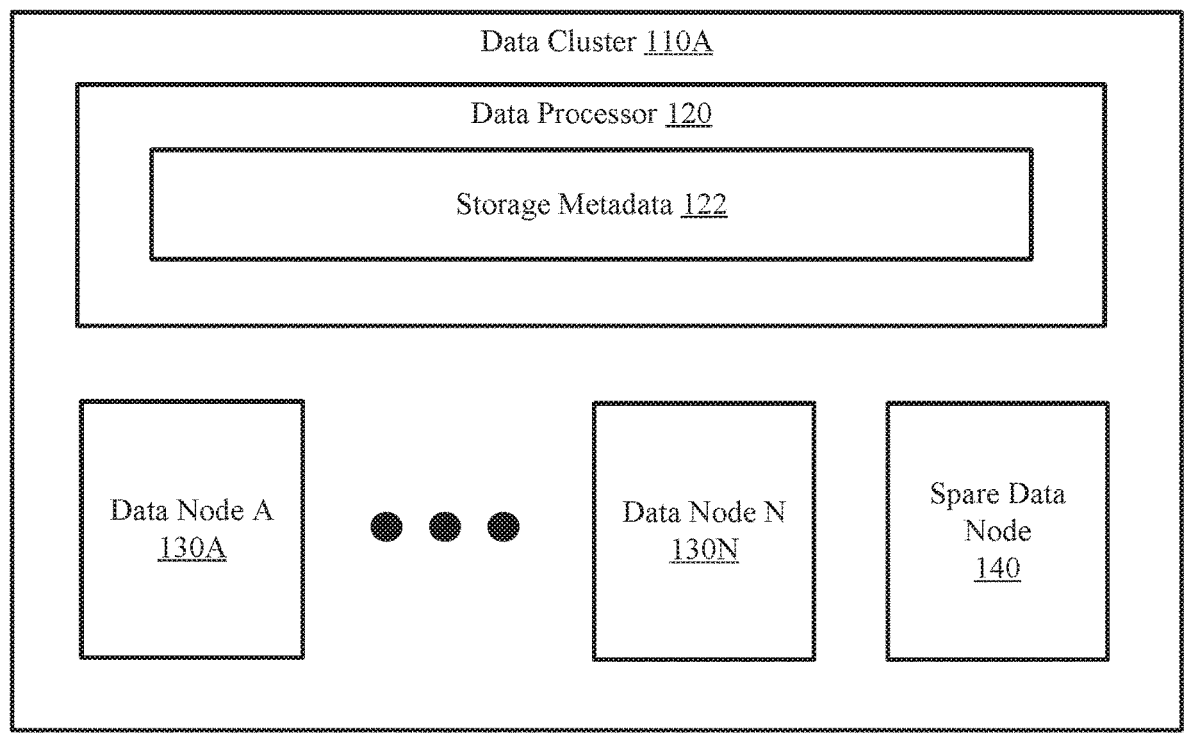
FIG. 1B shows a diagram of a data cluster in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to a method and system for storing data and metadata in a data cluster. More specifically, embodiments of the invention relate to proactively protecting data stored in a data cluster by performing proactive copy operations from a potentially failing persistent storage device to a spare location. Further, in various embodiments of the invention, the spare location may be a spare persistent storage device. In this scenario, a data processor may perform the method shown in FIG. 3A to proactively copy data from a potentially failing persistent storage device to the spare persistent storage device. Additionally, in various embodiments of the invention, the spare location may be a spare data node. In this scenario, a data processor may perform the method depicted in FIG. 3B to proactively copy data from the potentially failing persistent storage device to a persistent storage device of the spare data node. The data processor may then initiate the rebuilding of data from the potentially failing persistent storage device upon failure of the potentially failing persistent storage device in the spare location.

FIG. 1A shows an example system in accordance with one or more embodiments of the invention. The system includes a host (100) and a data cluster (110). The host (100) is operably connected to the data cluster (110) via any combination of wired and/or wireless connections.

In one or more embodiments of the invention, the host (100) utilizes the data cluster (110) to store data. The data stored may be backups of databases, files, applications, and/or other types of data without departing from the invention.

Figure 5:
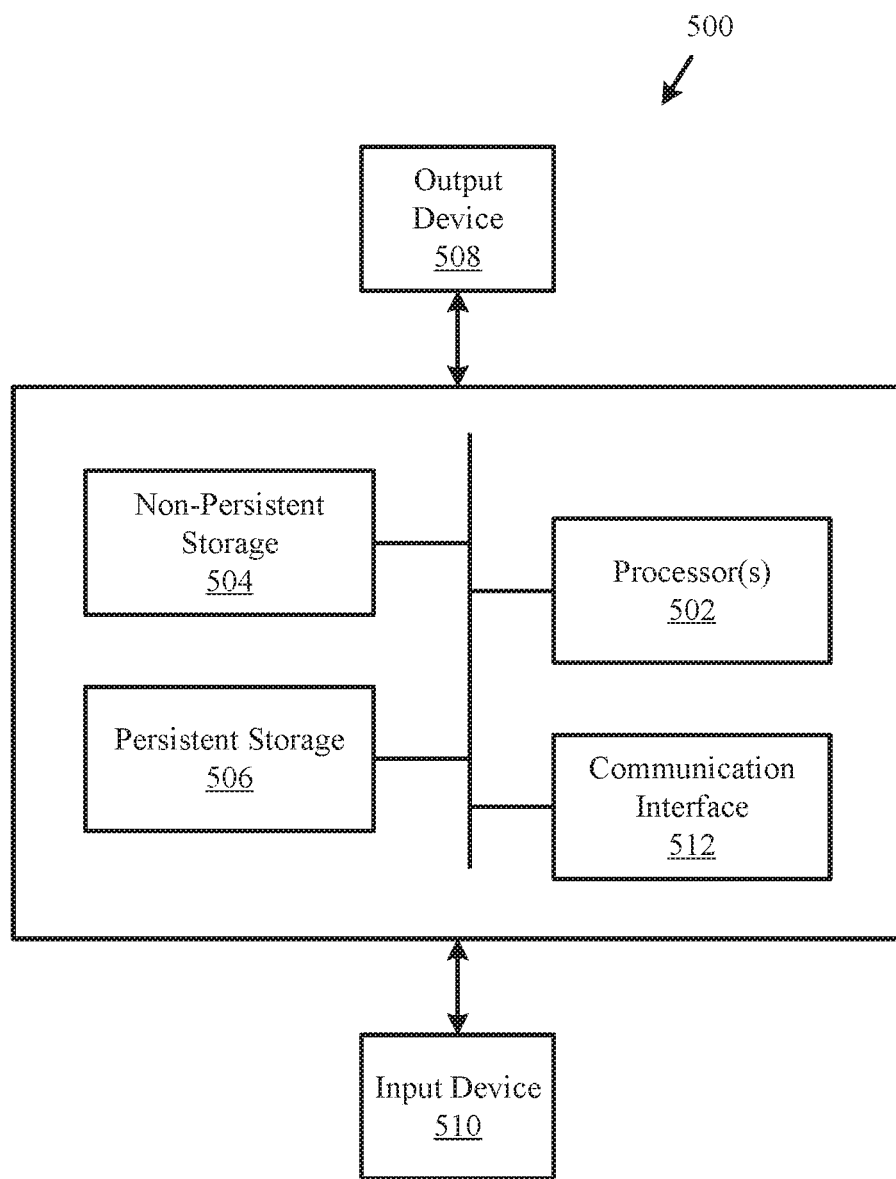
FIG. 5 shows a computing system in accordance with one or more embodiments of the invention.

In one or more embodiments of the invention, the host (100) is implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the host (100) described throughout this application.

In one or more embodiments of the invention, the host (100) is implemented as a logical device. The logical device may utilize the computing resources of any number of computing devices and thereby provide the functionality of the host (100) described throughout this application.

In one or more embodiments of the invention, the data cluster (110) stores data, metadata, and/or backups of data generated by the host (100). The data and/or backups may be deduplicated versions of data obtained from the host. The data cluster may, via an erasure coding procedure, store portions of the deduplicated data across data nodes operating in the data cluster (110).

As used herein, deduplication refers to methods of storing only portions of files (also referred to as file segments or segments) that are not already stored in persistent storage. For example, when multiple versions of a large file, having only minimal differences between each of the versions, are stored without deduplication, storing each version will require approximately the same amount of storage space of a persistent storage. In contrast, when the multiple versions of the large file are stored with deduplication, only the first version of the multiple versions stored will require a substantial amount of storage. Once the first version is stored in the persistent storage, the subsequent versions of the large file subsequently stored will be de-duplicated before being stored in the persistent storage resulting in much less storage space of the persistent storage being required to store the subsequently stored versions when compared to the amount of storage space of the persistent storage required to store the first stored version.

In one or more embodiments of the invention, an erasure coding procedure includes dividing the obtained data into portions, referred to as data chunks. Each data chunk may include any number of data segments associated with the obtained data. The individual data chunks may then be combined (or otherwise grouped) into data slices (also referred to as Redundant Array of Independent Disks (RAID) slices). One or more parity values are then calculated for each of the aforementioned slices. The number of parity values may vary based on the erasure coding algorithm that is being used as part of the erasure coding procedure. The chunks of a data slice may then be stored across different data nodes in a data cluster. Any chunk within a data slice may be reconstructed using the other chunks in the data slice. Non-limiting examples of erasure coding algorithms are RAID-3, RAID-4, RAID-5, and RAID-6. Other erasing coding algorithms may be used without departing from the invention.

Continuing with the discussion of FIG. 1A, the data cluster (110) may include persistent storage devices found within data nodes that each store any number of portions of data. The portions of data may be obtained by other persistent storage devices, data nodes, or from the host (100). For additional details regarding the data cluster (110), see, e.g., FIG. 1B.

FIG. 1B shows a diagram of a data cluster (110A) in accordance with one or more embodiments of the invention. The data cluster (110A) may be an embodiment of the data cluster (110, FIG. 1A) discussed above. The data cluster (110A) may include a data processor (120), any number of data nodes (130A, 130N), and a spare data node (140). In one embodiment of the invention, the data cluster may not include a spare data node (140). In such scenarios, each data node (130A, 130N) may include a spare persistent storage device (e.g., see FIG. 1C). The components of the data cluster (110A) may be operably connected via any combination of wired and/or wireless connections. Each of the aforementioned components is discussed below.

In one or more embodiments of the invention, the data processor (120) is a device (physical or logical) that includes the functionality to perform erasure encoding on data obtained from a host (e.g., 100, FIG. 1A) and manage the storage of the resulting data chunks in to the persistent storage devices of data nodes (130A, 130N) in the data cluster (110A). Additionally, in one or more embodiments of the invention, the data processor (120) orchestrates the rebuilding of a failed or potentially failing persistent storage device (e.g., 130A, 130N) using a spare location (i.e., a spare persistent storage device (148, FIG. 1C) or a spare data node (140)). The data processor (120) may perform the storage management and persistent storage device rebuilding via the methods illustrated in FIGS. 3A-3C. The data processor (120) may generate, utilize, and update storage metadata (122) as part of its erasure encoding, storage management, and persistent storage device rebuilding functionality. For additional details regarding the storage metadata (122), refer to FIG. 2.

Figure 3A:
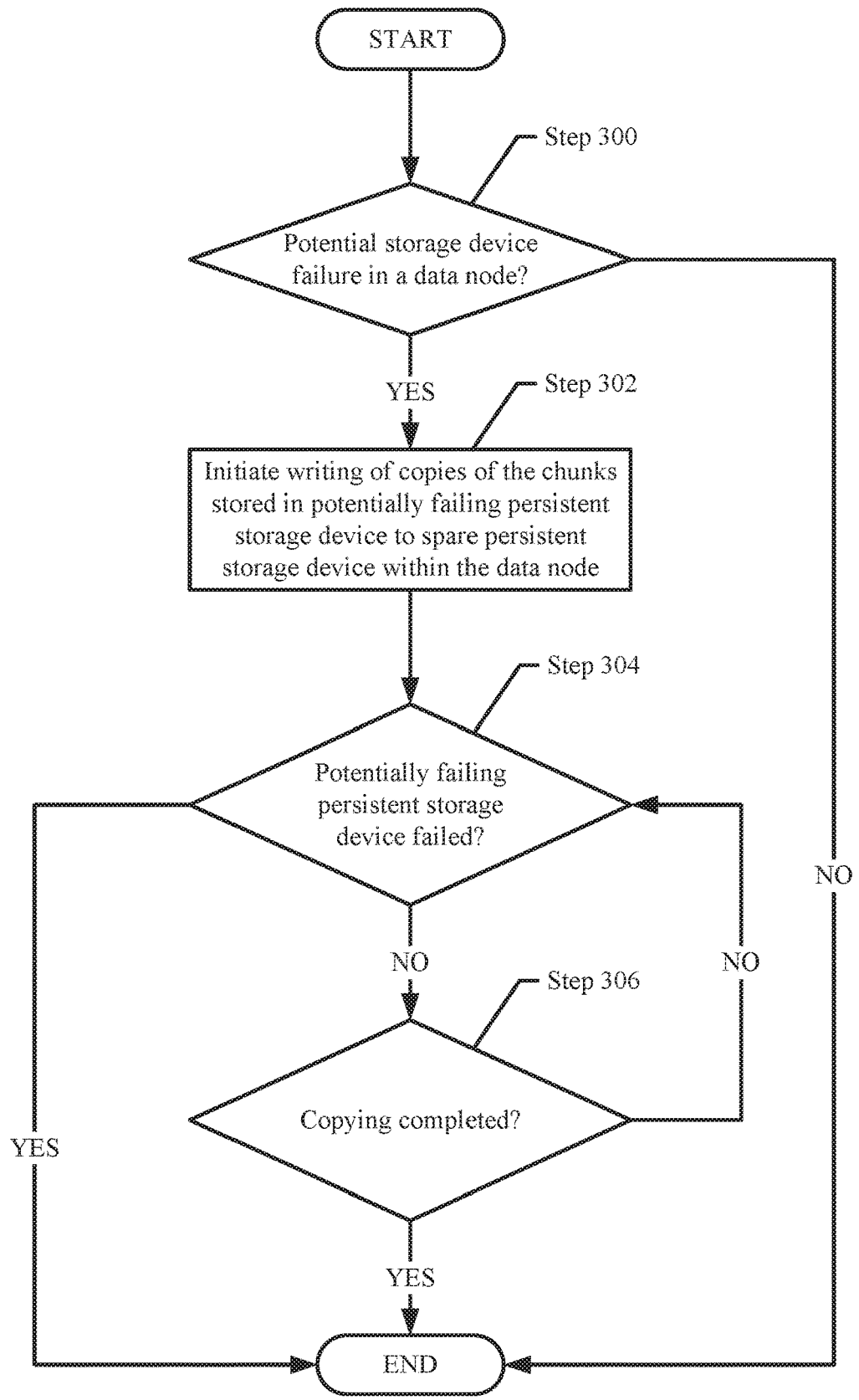
FIG. 3A shows a flowchart for performing a proactive copy operation to a spare persistent storage device in accordance with one or more embodiments of the invention.
Figure 3B:
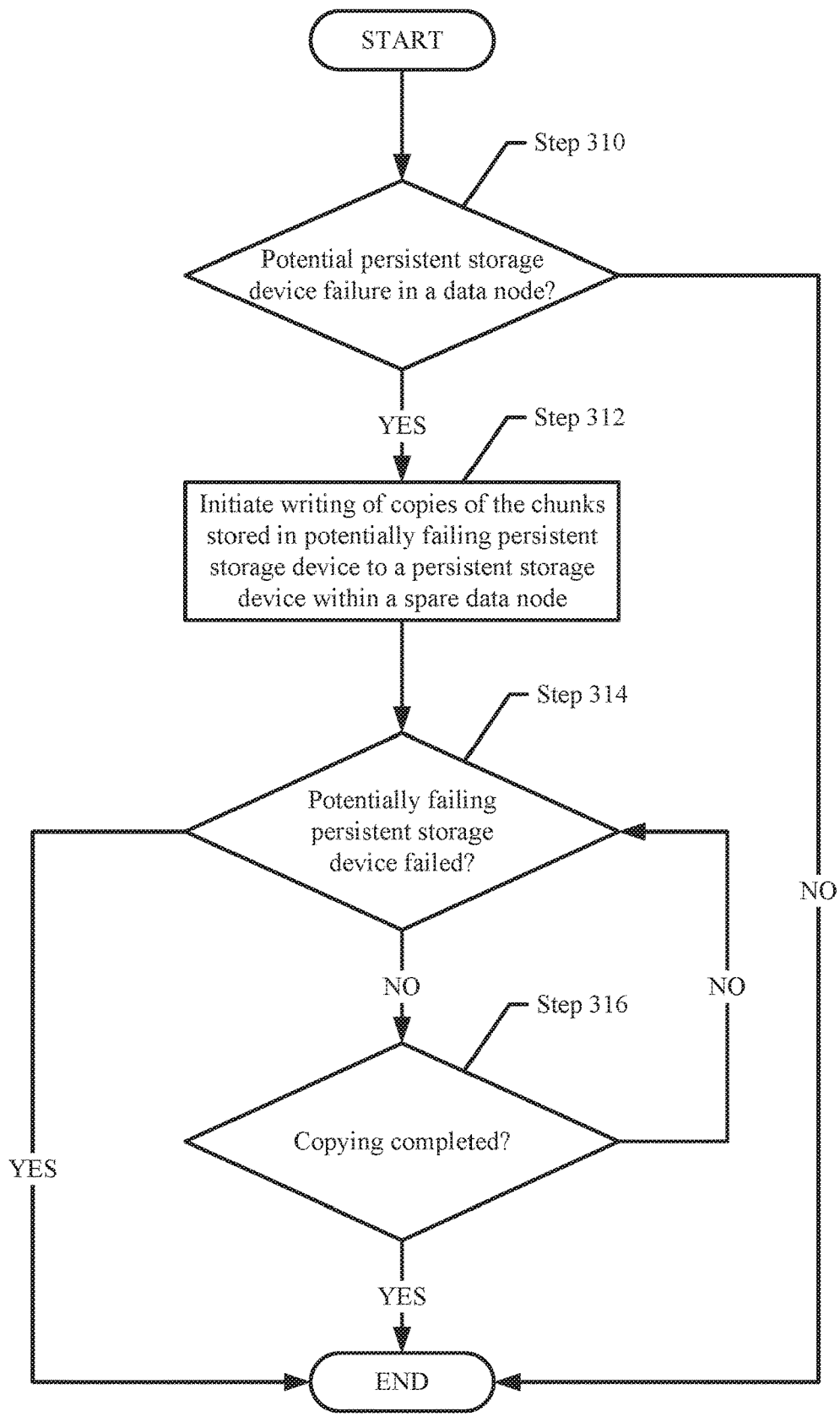
FIG. 3B shows a flowchart for performing a proactive copy operation to a spare data node in accordance with one or more embodiments of the invention.
Figure 3C:
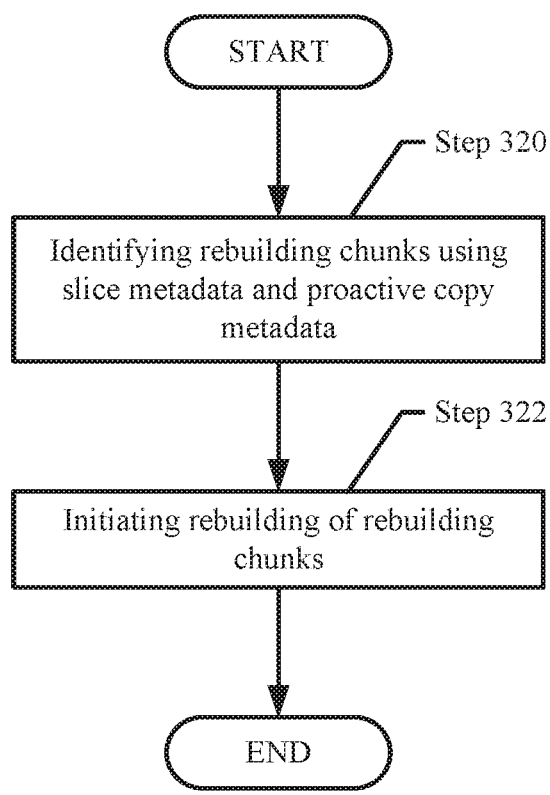
FIG. 3C shows a flowchart for performing a rebuild of a failed persistent storage device in accordance with one or more embodiments of the invention.

In one or more of embodiments of the invention, the data processor (120) is implemented as computer instructions, e.g., computer code, stored on a persistent storage device of a data node (130A, 130N) that when executed by a processor of a data node (e.g., 130A, 130N) cause the data node (130A, 130N) to provide the aforementioned functionality of the data processor (120) described throughout this application and/or all, or a portion thereof, of the methods illustrated in FIGS. 3A-3C.

In one or more embodiments of the invention, the data processor (120) is implemented as a computing device (see e.g., FIG. 5), which is operatively connected to (but separate from) the data nodes and spare nodes in the data cluster. The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the data processor (120) described throughout this application and/or all, or a portion thereof, of the methods illustrated in FIGS. 3A-3C.

In one or more embodiments of the invention, the data processor (120) is implemented as a logical device. The logical device may utilize the computing resources of any number of computing devices and thereby provide the functionality of the data processor (120) described throughout this application and/or all, or a portion thereof, of the methods illustrated in FIGS. 3A-3C.

In one or more embodiments of the invention, the data nodes (130A, 130N) store data chunks and parity chunks (as described below). The data nodes (130A, 130N) may include persistent storage devices (e.g., 136A, 136N, FIG. 1C) that may be used to store the data chunks, parity chunks and storage metadata. The management of the data chunks and parity chunks is described below with respect to FIGS. 3A-3C. For additional details regarding the data nodes (130A, 130N), see, e.g., FIG. 1C.

In one or more embodiments of the invention, each data node (130A, 130N) is implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the data node (130A, 130N) described throughout this application.

In one or more embodiments of the invention, each of the data nodes (130A, 130N) is implemented as a logical device. The logical device may utilize the computing resources of any number of computing devices and thereby provide the functionality of the data nodes (130A, 130N) described throughout this application. For additional details regarding the data nodes (130A, 130N), see, e.g., FIG. 1C.

In one or more embodiments of the invention, the spare data node (140) stores data like the data nodes (130A, 130N). The data may be data chunks and/or parity chunks. However, unlike the data nodes (130A, 130N), the spare data node (140) is a passive data node. In other words, the spare data node (140) does not participate in the direct storage of data from the host (e.g., 100, FIG. 1A) like the data nodes (130A, 130N). Instead, the data processor (120) may use the spare data node (140) to store data chunks and parity chunks, as well as use the aforementioned stored chunks to rebuild the corresponding chunks on failed persistent storage devices (e.g., 136A, 136N, FIG. 1C) of data nodes (130A, 130N). For additional details regarding the spare data node (140), see, e.g., FIG. 1D.

In one or more embodiments of the invention, the spare data node (140) is implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the spare data node (140) described throughout this application.

In one or more embodiments of the invention, the spare data node (140) is implemented as a logical device. The logical device may utilize the computing resources of any number of computing devices and thereby provide the functionality of the spare data node (140) described throughout this application. For additional details regarding the spare data node (140), see, e.g., FIG. 1D.

The spare data node (140) may include more storage capacity than the data nodes (130A, 130N) in order to store larger quantities of data (e.g., data chunks and parity chunks) as a result of proactive copy operations, and persistent storage device rebuild operations. For additional information regarding proactive copy operations and persistent storage device rebuild operations involving a spare data node (140), refer to FIG. 3B and FIG. 3C, respectively.

Figure 1C:
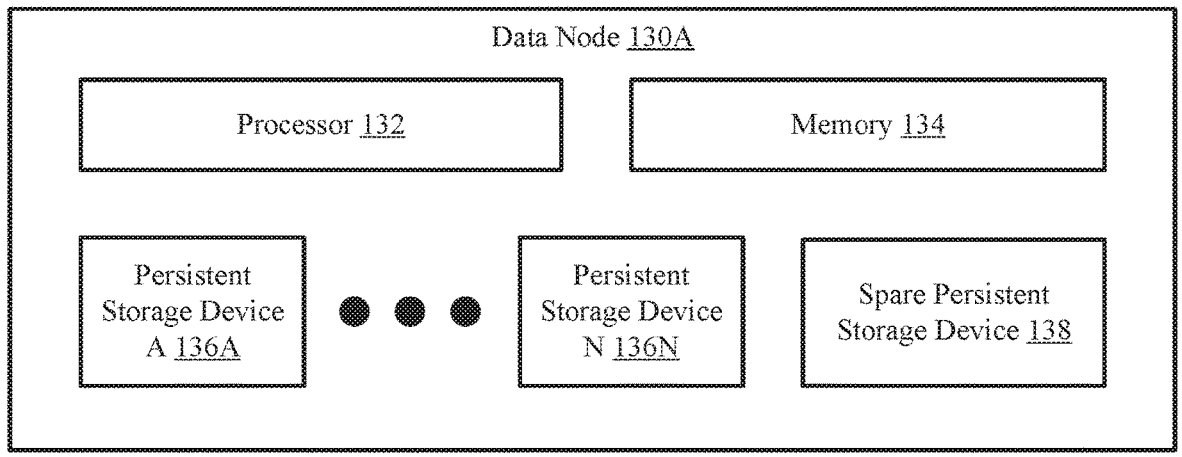
FIG. 1C shows a diagram of a data node in accordance with one or more embodiments of the invention.

FIG. 1C shows a diagram of a data node (130A) in accordance with one or more embodiments of the invention. The data node (130A) may be an embodiment of the data nodes (130A, 130N, FIG. 1B) discussed above. Each data node may include a processor (132), memory (134), and one or more persistent storage devices (136A, 136N). In one embodiment of the invention, if the data cluster (110A, FIG. 1B) discussed above does not include a spare data node (140, FIG. 1B), then the data node may also include a spare persistent storage device (138). Each component of the data node (130A) may be operatively connected to each other via wired and/or wireless connections. The data node (130A) may have additional, fewer, and/or different components without departing from the invention. Each of the illustrated components of the data node (130A) is discussed below.

In one or more embodiments of the invention, the processor (132) is a component that processes data and processes requests. The processor (132) may be, for example, a central processing unit (CPU). The processor (132) may be other types of processors without departing from the invention. The processor (132) may process a request to store data and/or metadata and rebuild data and/or metadata using data stored in memory (134), the persistent storage devices (136A, 136N), and/or other data nodes (e.g., 130N, FIG. 1B). The processor (132) may process other requests without departing from the invention.

In one or more embodiments of the invention, the data node (130A) includes memory (134), which stores data that is more accessible to the processor (142) than the persistent storage devices (136A, 136N). The memory (134) may be volatile storage. Volatile storage may be storage that stores data that is lost when the storage loses power. The memory may be, for example, Random Access Memory (RAM). In one or more embodiments of the invention, a copy of the data and/or parity chunks required for a persistent storage device rebuilding operation are stored in the memory (134) of the data node (130A).

In one or more embodiments of the invention, the persistent storage devices (136A, 136N) store data and rebuild data. The data may be data chunks and/or parity chunks. The persistent storage devices (136A, 136N) may include non-volatile storage (also referred to as persistent storage). In other words, the data stored in the persistent storage devices (136A, 136N) is not lost or removed when the persistent storage devices (136A, 136N) lose power. For additional details regarding the persistent storage devices, see, e.g., FIG. 1E.

In one or more embodiments of the invention, the spare persistent storage device (138) stores data like the persistent storage devices (136A, 136N). The data may be data chunks and/or parity chunks. However, unlike the persistent storage devices (136A, 136N), the spare persistent storage device (138) is a passive persistent storage device. In other words, the spare persistent storage device (138) does not participate in the direct storage of data from the host (e.g., 100, FIG. 1A) like the persistent storage devices (136A, 136N). Instead, the data processor (120) may use the spare persistent storage device (138) to store data chunks and parity chunks, as well as use the aforementioned stored chunks to rebuild the corresponding chunks of failed persistent storage devices (e.g., 136A, 136N). For additional details regarding the persistent storage devices, see, e.g., FIG. 1E.

The spare persistent storage device (138) may include more storage capacity than the persistent storage devices (136A, 136N) in order to store larger quantities of data (e.g., data chunks and parity chunks) as a result of proactive copy operations and persistent storage device rebuild operations. For additional information regarding proactive copy operations using a spare persistent storage device and persistent storage device rebuild operations, refer to FIG. 3A and FIG. 3C, respectively.

Figure 1D:
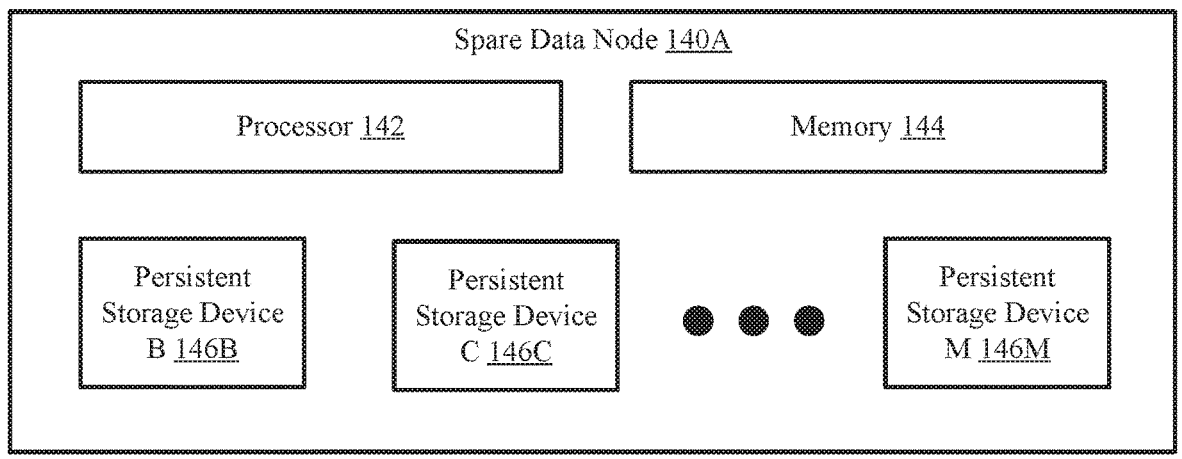
FIG. 1D shows a diagram of a spare data node in accordance with one or more embodiments of the invention.

FIG. 1D shows a diagram of a spare data node (140A) in accordance with one or more embodiments of the invention. The spare data node (140A) may be an embodiment of the data nodes (130A, 130N, FIG. 1B) discussed above. Each data node may include a processor (132), memory (134), and one or more persistent storage devices (136A, 136N). Each component of the spare data node (140A) may be operatively connected to each other via wired and/or wireless connections. The spare data node (140A) may have additional, fewer, and/or different components without departing from the invention. Each of the illustrated components of the spare data node (140A) is discussed below.

In one or more embodiments of the invention, the processor (142) is a component that processes data and processes of requests. The processor (142) may be, for example, a central processing unit (CPU). The processor may be other types of processors without departing from the invention. The processor may process a request to store data and/or metadata and rebuild data and/or metadata using data stored in memory (144), the persistent storage devices (146B, 146C, 146C), and/or other data nodes (e.g., 140A, 140N, FIG. 1B). The processor (142) may process other requests without departing from the invention.

In one or more embodiments of the invention, the spare data node (140A) includes memory (144), which stores data that is more accessible to the processor (142) than the persistent storage devices (146B, 146C, 146M). The memory (144) may be volatile storage. Volatile storage may be storage that stores data that is lost when the storage loses power. The memory may be, for example, Random Access Memory (RAM). In one or more embodiments of the invention, a copy of the data and/or parity chunks required for a persistent storage device rebuilding operation are stored in the memory (144) of the spare data node (140A).

In one or more embodiments of the invention, the persistent storage devices (146B, 146C, 146M) store data and rebuild data. The data may be data chunks and/or parity chunks. The persistent storage devices (146B, 146C, 146M) may include non-volatile storage (also referred to as persistent storage). In other words, the data stored in the persistent storage devices (146B, 146C, 146M) is not lost or removed when the persistent storage devices (146B, 146C, 146M) lose power. For additional details regarding the persistent storage devices, see, e.g., FIG. 1E.

In one or more embodiments of the invention, the persistent storage devices (146B, 146C, 146M) are implemented as computing devices (see e.g., FIG. 5). The computing devices may be, for example, a laptop computer, a desktop computer, a server, a distributed computing system, or a cloud resource (e.g., a third-party storage system accessible via a wired or wireless connection). The computing devices may include one or more processors, memory (e.g., random access memory), and persistent storage (e.g., disk drives, solid state drives, etc.). The computing devices may include instructions, stored on the persistent storage, that when executed by the processor(s) of the computing devices cause the computing devices to perform the functionality of the persistent storage devices (146B, 146C, 146M) described throughout this application. For additional details regarding the persistent storage devices, see, e.g., FIG. 1E.

In one or more embodiments of the invention, the persistent storage devices (146B, 146C, 146M) are implemented as logical devices. The logical devices may utilize the computing resources of any number of computing devices and thereby provide the functionality of the persistent storage devices (146B, 146C, 146M) described throughout this application.

Figure 1E:
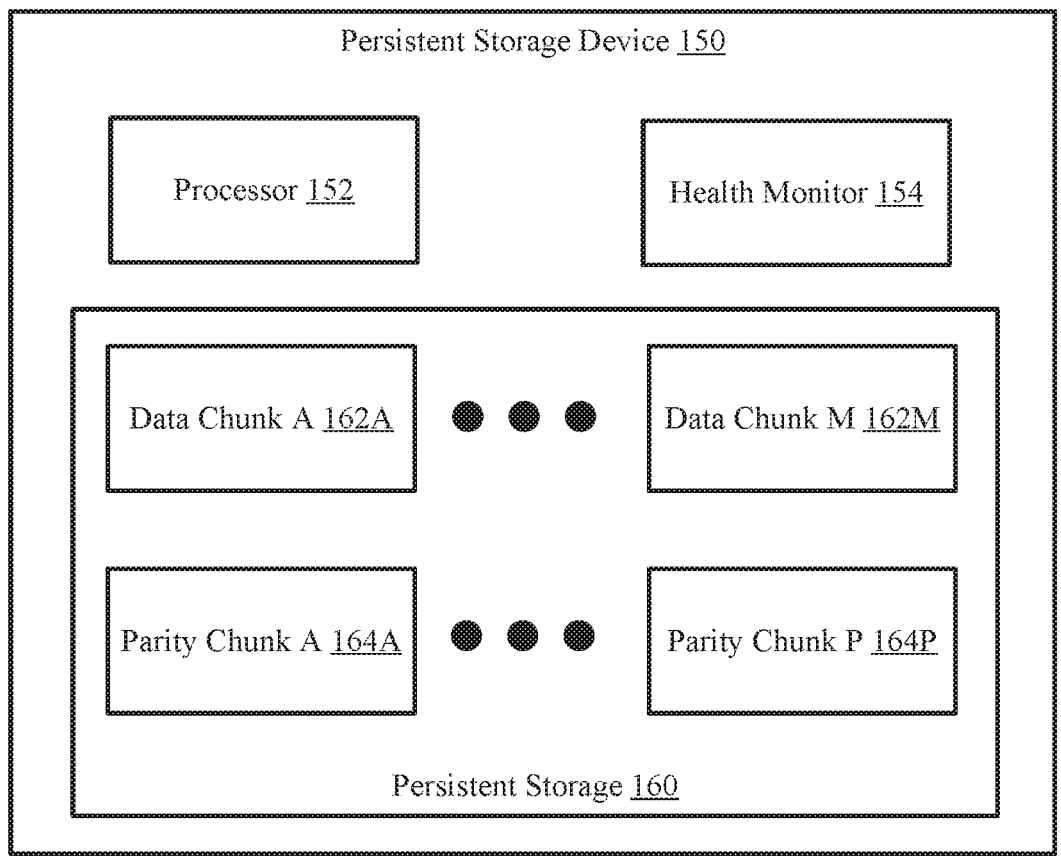
FIG. 1E shows a diagram of a persistent storage device in accordance with one or more embodiments of the invention.

FIG. 1E shows a diagram of a persistent storage device (150) in accordance with one or more embodiments of the invention. The persistent storage device (150) may be an embodiment of a persistent storage device discussed above (136A, 136N, 146B, 146C, 146M) discussed above. As discussed above, the persistent storage device (150) stores and rebuilds. The data may be data chunks (162A, 162M) and parity chunks (164A, 164P). The persistent storage device (150) may include a processor (152), health monitor (154), and persistent storage (160). Each of these components is discussed below.

In one or more embodiments of the invention, the processor (152) is a component that processes data and processes requests. The processor (142) may be, for example, a central processing unit (CPU). The processor (152) may be other types of processors without departing from the invention. The processor (152) may process a request to store data and rebuild data using data stored in persistent storage (160) or from other persistent storage devices (e.g., 130A, 130N, FIG. 1B). The processor (152) may process other requests without departing from the invention.

In one or more embodiments of the invention, the health monitor (154) is a component that monitors the health of persistent storage (160) of the persistent storage device (150). The health monitor (154) may be, for example, computer instructions that when executed by a processor (e.g., 152) of the persistent storage device (150), enables the persistent storage device (150) to perform the functionality of the health monitor (154).

In one or more embodiments of the invention, the health monitor (154) is implemented using a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the health monitor (154) described throughout this application. The health monitor may be implemented using another type of physical device without departing from the invention.

The health monitor (154) may detect and report various indicators of persistent storage (160) reliability with the intent of anticipating persistent storage (160) failures. The indicators of persistent storage (160) reliability may include attributes that have threshold values that should not be passed under normal operating conditions of the persistent storage device (150). The health monitor (154) may monitor these attributes and send a notification to the data processor (120, FIG. 1B) when these attributes indicate a potential persistent storage device (150) failure. These attributes may include, for example, reallocated sectors, temperature, and flash endurance parameters. The attributes may include other and/or additional parameters without departing from the invention.

As discussed above, the persistent storage (160) may store data. The data stored in persistent storage 160) may include data chunks (162A, 162M) and parity chunks (164A, 164P). Each of these data structures is discussed below. The persistent storage (160) may store other and/or additional data without departing from the invention.

The persistent storage (160) may be implemented using physical storage devices and/or logical storage devices. The physical storage devices may include any combination of hard disk drives, solid state disk drives, tape drives, and/or any other physical storage mediums for the storage of data.

The logical storage devices (e.g., virtualized storage) may utilize any quantity of hardware storage resources of any number of computing devices for storing data. For example, the persistent storage (160) may utilize portions of any combination of hard disk drives, solid state disk drives, tape drives, and/or any other physical storage medium of any number of computing devices.

In one or more embodiments of the invention, a data chunk (162A, 162M) is a data structure that includes a portion of data that was obtained from a host. The data chunks (162A, 162M) may be (but are not required to be) deduplicated by a data processor and obtained by the persistent storage device (150) from the data processor. Each of the data chunks (162A, 162M) may be used by the persistent storage device (150) (or another persistent storage device) to reconstruct another data chunk or a parity chunk based on an erasure coding algorithm that was applied to the other data chunk or parity chunk.

In one or more embodiments of the invention, a parity chunk (164A, 164P) is a data structure that includes a parity value generated using an erasure coding algorithm. The parity value may be generated by applying the erasure coding algorithm to one or more data chunks stored in the persistent storage device (150) or other data nodes. Each of the parity chunks (164A, 164P) may be used by the persistent storage device (150) (or another persistent storage device) to reconstruct another parity chunk or a data chunk based on an erasure coding algorithm that was applied to the other parity chunk or data chunk.

Figure 2:
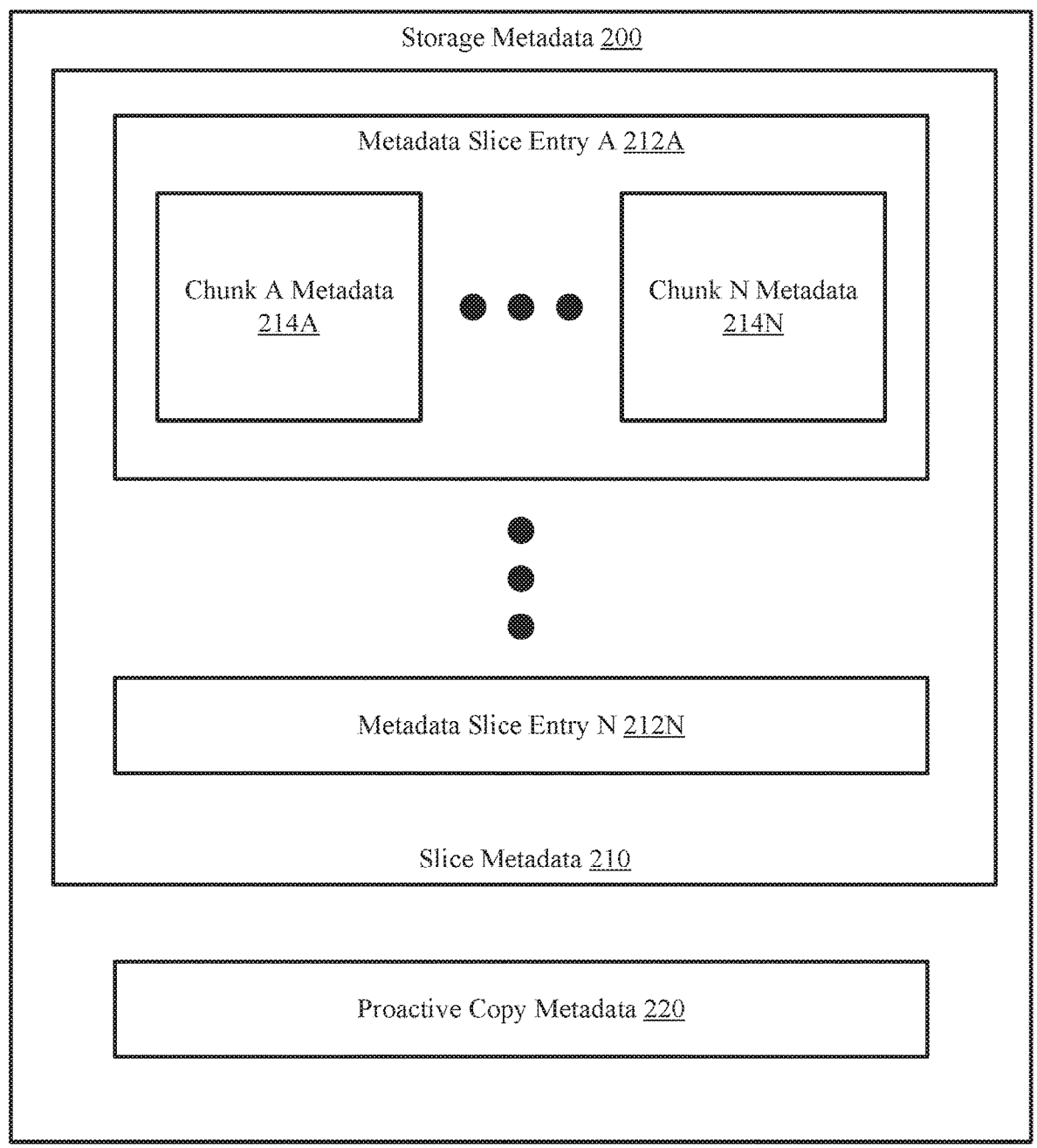
FIG. 2 shows a diagram of storage metadata in accordance with one or more embodiments of the invention.

FIG. 2 shows a diagram of storage metadata in accordance with one or more embodiments of the invention. The storage metadata (200) may be an embodiment of the storage metadata (122, FIG. 1B) discussed above. As discussed above, the storage metadata (200) includes information about data chunks and/or parity chunks (collectively, chunks). The storage information may include slice metadata (210) and proactive copy metadata (220). Each of the aforementioned portions of storage metadata (200) is discussed below.

In one or more embodiments of the invention, slice metadata (210) includes metadata associated with data slices. Each data slice may have an associated metadata slice entry (e.g., 212A, 212N) generated by the data processor (120, FIG. 1B) when the data slice was generated and stored across the persistent storage devices (e.g., 136A, 136N, FIG. 1B) of data nodes (130A, 130N, FIG. 1B) in the data cluster (e.g., 110A, FIG. 1B). The metadata slice entry (212A, 212N) includes chunk metadata (214A, 214N). Each chunk of a chunk metadata (214A, 214N) may correspond to metadata for a data chunk or a parity chunk. Each chunk metadata (214A, 214N) may include information about a chunk such as, for example, a unique identifier (e.g., a fingerprint) that may be used to differentiate the chunks stored in the data cluster (110, FIG. 1A), a storage location of the chunk (e.g., the persistent storage device and data node in which the chunk is stored), and a data slice identifier that identifies the data slice in which the chunk is associated. The chunk metadata (214A, 214N) may include other and/or additional information regarding the chunks without departing from the invention.

In one or more embodiments of the invention, the proactive copy metadata (220) includes metadata associated with data and/or parity chunks that were copied and stored in the spare persistent storage device or a persistent storage device of the spare data node during a proactive copy operation. The data processor (120, FIG. 1B) may use the proactive copy metadata (220) during a persistent storage rebuild operation. For additional information regarding persistent storage rebuild operations, refer to FIG. 3C. The proactive copy metadata (220) may be generated during proactive copy operations. The proactive copy metadata (230) may include chunk identifiers (e.g., a fingerprint) that may be used to differentiate the chunks stored in the data cluster (110, FIG. 1A), storage locations of the chunks (e.g., the persistent storage device and data node in which the chunk is stored), and associated data slice identifiers that identify the data slice in which a chunk is associated. The proactive copy metadata (230) may include other and/or additional information without departing from the invention.

FIG. 3A shows a flowchart for performing a proactive copy operation to a spare persistent storage device in accordance with one or more embodiments of the invention. The method shown in FIG. 3A may be performed by, for example, a data processor (120, FIG. 1B). Other components of the system illustrated in FIG. 1B may perform the method of FIG. 3A without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

In step 300, a determination is made as to whether there is a potential persistent storage device failure in a data node. In one or more embodiments of the invention, the data processor may receive a notification from a health monitor of a persistent storage device indicating that the persistent storage device may potentially fail. If there is a potential persistent storage device failure, the method proceeds to step 302. If there is not a potential persistent storage device failure, the method may end following step 300.

In step 302, the writing of copies of chunks stored in the potentially failing persistent storage device to a spare persistent storage device within the data node is initiated. In one or more embodiments of the invention, the data processor sends a request to the persistent storage device from which to potential failure notification originated to copy and send all data and/or parity chunk stored in the potentially failing persistent storage device to the spare persistent storage device. The request may include chunk identifiers specifying which data and/or parity chunks to copy and send to the spare persistent storage device. The data processor may then generate proactive copy metadata, wherein information regarding the chunks associated with the proactive copy operation is included.

Upon receiving the request to copy and send data and/or parity chunks, the potentially failing persistent storage device may copy the specified chunks and send the copies to the spare persistent storage device. After receiving the chunks from the potentially failing persistent storage device, the spare persistent storage device may store the chunks in persistent storage.

The spare persistent storage device may then send confirmation to the data processor. The confirmation may include information regarding the newly stored chunks. The newly stored chunk information may include, for example, chunk identifiers and chunk storage locations. The newly stored information may include other and/or additional information regarding the newly stored chunks without departing from the invention. The data processor may then update the proactive copy metadata with the information included in the confirmation.

In step 304, a determination is made as to whether the potentially failing persistent storage device has failed. The data processor may attempt to store or access data within the potentially failing persistent storage device and the persistent storage device may be unavailable due to failure or the data processor may receive an error indicating that the persistent storage device failed. If the potentially failing persistent storage device failed, the method may end following step 304. If the potentially failing persistent storage device has not failed, the method proceeds to step 306.

In step 306, a determination is made as to whether the copying of chunks from the failing persistent storage device to the spare persistent storage device is complete. If the copying of the chunks in the potentially failing persistent storage device to the spare persistent storage device is complete, the method may end following step 306. If the copying of the chunks in the potentially failing persistent storage device to the spare persistent storage device is not complete, the method proceeds to step 304.

The method may end following step 306.

FIG. 3B shows a flowchart for performing a proactive copy operation to a spare data node in accordance with one or more embodiments of the invention. The method shown in FIG. 3B may be performed by, for example, a data processor (120, FIG. 1B). Other components of the system illustrated in FIG. 1B may perform the method of FIG. 3B without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

In step 310, a determination is made as to whether there is a potential persistent storage device failure in a data node. In one or more embodiments of the invention, the data processor may receive a notification from a health monitor of a persistent storage device indicating that the persistent storage device may potentially fail. If there is a potential persistent storage device failure, the method proceeds to step 312. If there is not a potential persistent storage device failure, the method may end following step 310.

In step 312, the writing of copies of chunks stored in the potentially failing persistent storage device to a persistent storage device within a spare data node is initiated. In one or more embodiments of the invention, the data processor sends a request to the persistent storage device from which to potential failure notification originated to copy and send all data and/or parity chunk stored in the potentially failing persistent storage device to a persistent storage device within the spare data node. The request may include chunk identifiers specifying which data and/or parity chunks to copy and send to the persistent storage device of the spare data node. The data processor may then generate proactive copy metadata, wherein information regarding the chunks associated with the proactive copy operation is included.

Upon receiving the request to copy and send data and/or parity chunks, the potentially failing persistent storage device may copy the specified chunks and send the copies to the persistent storage device of the spare data node. After receiving the chunks from the potentially failing persistent storage device, the persistent storage device of the spare data node may store the chunks in persistent storage.

The persistent storage device of the spare data node may then send confirmation to the data processor. The confirmation may include information regarding the newly stored chunks. The newly stored chunk information may include, for example, chunk identifiers and chunk storage locations. The newly stored information may include other and/or additional information regarding the newly stored chunks without departing from the invention. The data processor may then update the proactive copy metadata with the information included in the confirmation.

In step 314, a determination is made as to whether the potentially failing persistent storage device has failed. The data processor may attempt to store or access data within the potentially failing persistent storage device and the persistent storage device may be unavailable due to failure, or the data processor may receive an error indicating that the persistent storage device failed. If the potentially failing persistent storage device failed, the method may end following step 314. If the potentially failing persistent storage device has not failed, the method proceeds to step 316.

In step 316, a determination is made as to whether the copying of chunks from the failing persistent storage device to the persistent storage device of the spare data node is complete. If the copying of the chunks in the potentially failing persistent storage device to the persistent storage device of the spare data node is complete, the method may end following step 316. If the copying of the chunks in the potentially failing persistent storage device to the persistent storage device of the spare data node is not complete, the method proceeds to step 314.

The method may end following step 316.

FIG. 3C shows a flowchart for performing a rebuild of a failed persistent storage device in accordance with one or more embodiments of the invention. The method shown in FIG. 3C may be performed by, for example, a data processor (120, FIG. 1B). Other components of the system illustrated in FIG. 1B may perform the method of FIG. 3C without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

In step 320, the rebuilding chunks are identified using slice metadata and proactive copy metadata. The data processor may use the slice metadata to identify all of the data and parity chunks stored in the failed persistent storage device. The data processor may use the proactive copy metadata to identify all of the chunks associated with the failed persistent storage device already stored in the spare persistent storage device or the persistent storage device of the spare data node. The data processor may compare all the data chunks stored on the failed persistent storage device with the chunks associated with the failed persistent storage device already stored in the spare persistent storage device or the persistent storage device of the spare data node to identify the rebuilding chunks. The rebuilding chunks may refer to data and/or parity chunks that need to be rebuilt to complete the rebuilding of the failed persistent storage device.

In step 322, the rebuilding of the rebuilding chunks is initiated. The data processor may send a request to the spare persistent storage device or the persistent storage device of the spare data node to rebuild the rebuilding chunks. The request may include which chunks to use to rebuild the rebuilding chunks and the algorithm to use to rebuild the building chunks.

In one embodiment of the invention, the spare persistent storage device or the persistent storage device of the spare data node may not be able to rebuild the rebuilding chunks using only the data and/or parity chunks already stored in the spare persistent storage device or the persistent storage device of the spare data node as a result of the proactive copy operation. Therefore, the rebuilding chunks may require data and/or parity chunks not stored on the spare persistent storage device or the persistent storage device of the spare data node. The data processor may use slice metadata to identify the persistent storage devices of other data nodes in which the data and/or parity chunks required to rebuild the rebuilding chunks are stored. If rebuilding chunks require data and/or parity chunks not stored on the spare persistent storage device or the persistent storage device of the spare data node, the data processor may use slice metadata to identify the persistent storage devices in which the data and/or parity chunks required to rebuild the rebuilding chunks are stored. The data processor may then send requests to the persistent storage devices of other data nodes to copy and send the chunks required to rebuild the rebuilding chunks to the spare persistent storage device or the persistent storage device of the spare data node. The data processor may then send a request to the spare persistent storage device or the persistent storage device of the spare data node to rebuild the rebuilding chunks. After completing the rebuild of the rebuilding chunks, the spare persistent storage device or the persistent storage device of the spare data node may delete the chunks that are not associated with the failed persistent storage device.

The method may end following step 322.

EXAMPLE

Figure 4A:
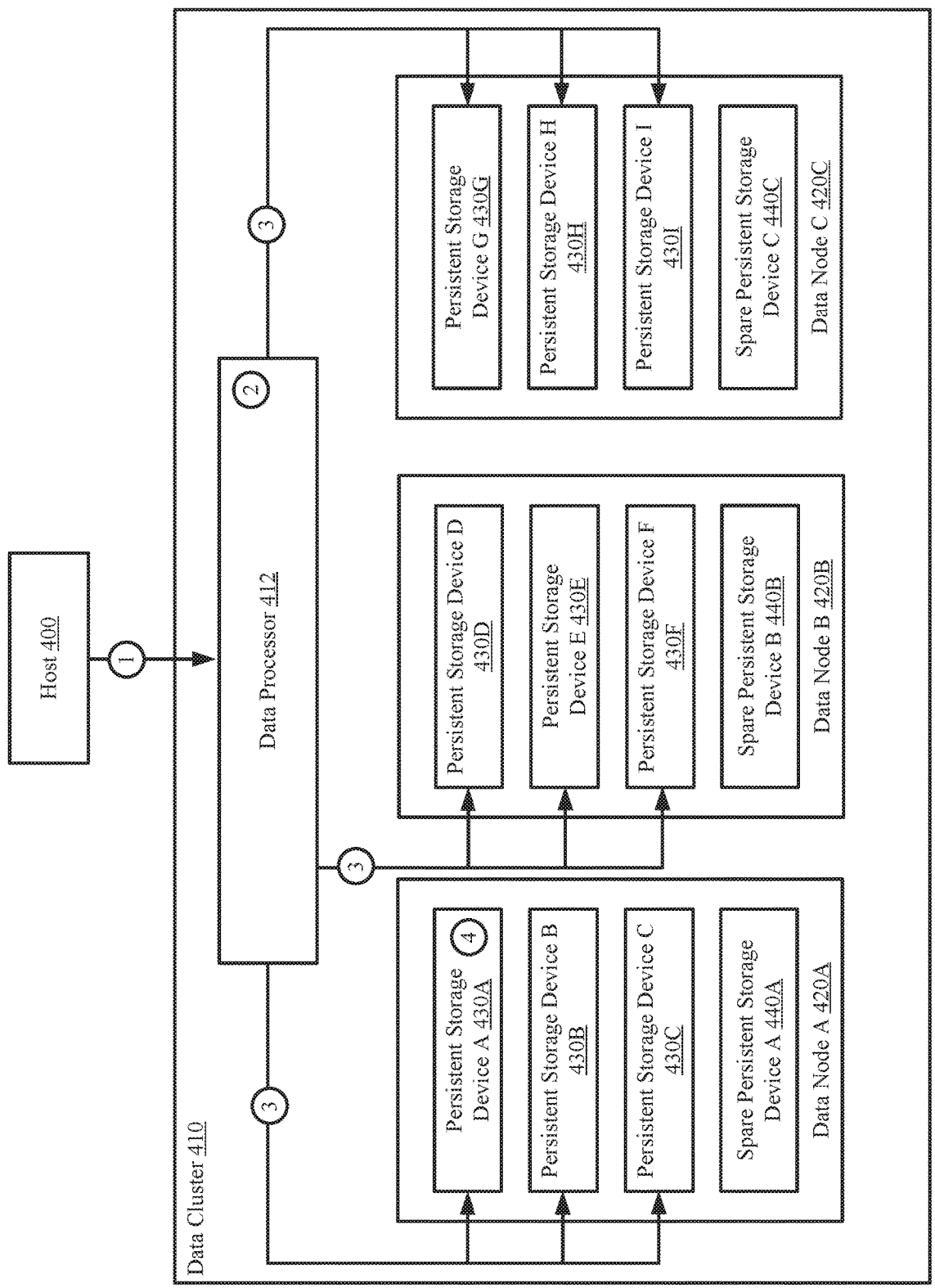
FIGS. 4A-4B show a first example in accordance with one or more embodiments of the invention.
Figure 4B:
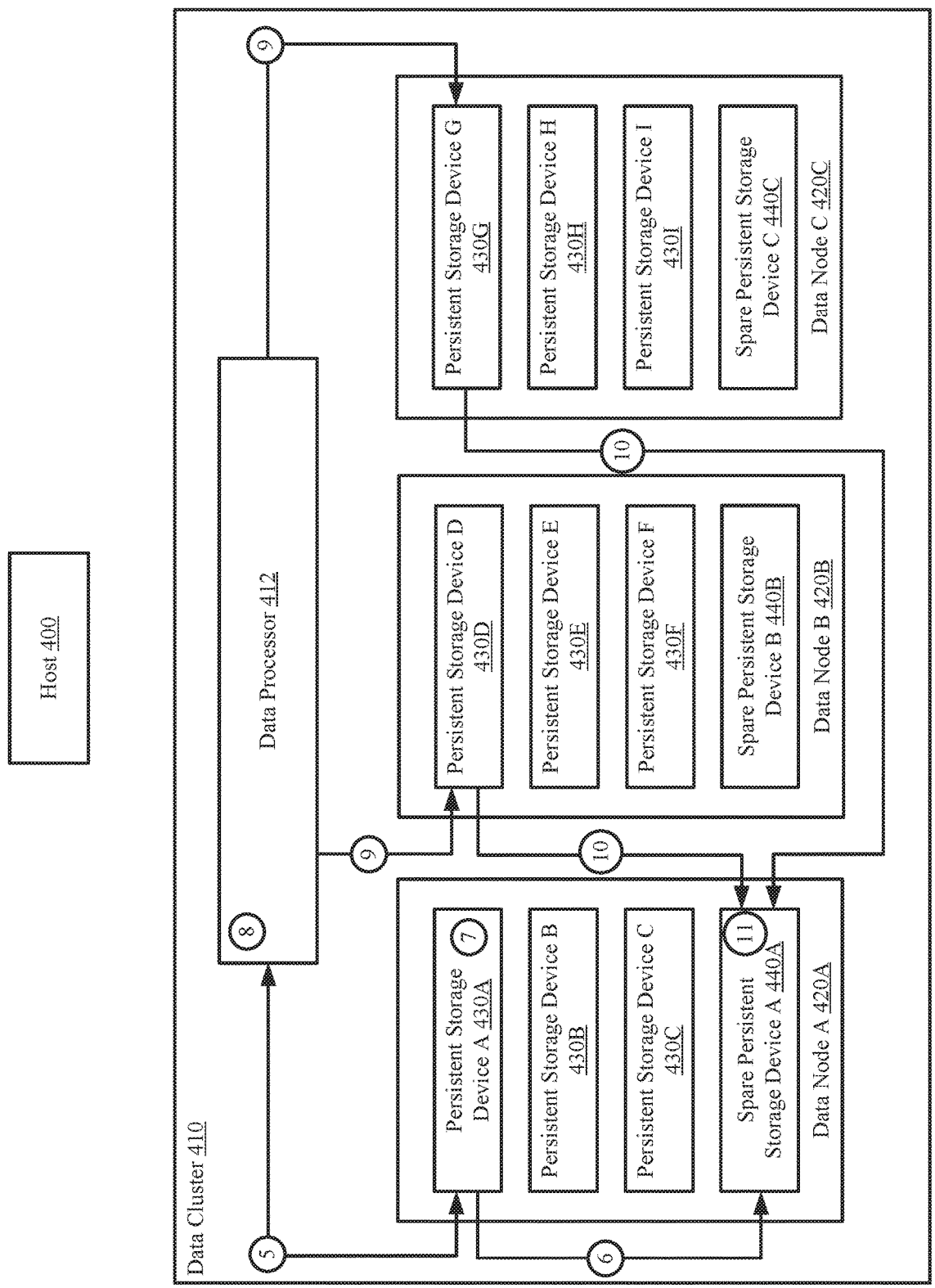

The following sections describe two examples. The examples are not intended to limit the invention. FIGS. 4A-4B show a first example in accordance with one or more embodiments of the invention. Turning to the first example, consider a scenario in which a data cluster obtains data from a host. The data is a file. The host requests the file to be stored in the data cluster using a 2:1 erasure coding procedure. FIG. 4A shows a diagram of a first example system in accordance with one or more embodiments of the invention. The host (400) sends the request to a data processor (412) of a data cluster (410) [1]. The data processor (412) performs an erasure coding on the file, breaking the file into data and parity chunks (not shown), resulting in three sets of data slices [2]. The data processor then sends the chunks to each of the data nodes (420A, 420B, 420C) in which they are stored [3].

More specifically, the chunks of the first set of data slices (not shown) are stored in persistent storage device A (430A) of Data node A (420A), persistent storage device D (430D) of data node B (420B), and persistent storage device G (430G) of data node C (420C). The chunks of the second set of data slices are stored in persistent storage device B (430B) of data node A (420A), persistent storage device E (430E) of data node B (420B), and persistent storage device H (430H) of data node C (420C). The chunks of the third set of data slices are stored in persistent storage device C (430C) of data node A (420A), persistent storage device F (430F) of data node B (420B), and persistent storage device I (4301) of data node C (420C). After the chunks are stored in the data nodes, the health monitor of persistent storage device A (430A) detects a potential failure within persistent storage device A (430A) [4].

FIG. 4B shows an example of the methods depicted in FIG. 3A and FIG. 3C. Continuing with the first example, persistent storage device A (430A) then notifies the data processor (412) of a potential failure, and, in response, the data processor (412) sends a request initiating a proactive copy operation (the method depicted in FIG. 3A) [5]. The request includes the data and/or parity chunks to be copied and sent to spare persistent storage device A (440A). After receiving the request, persistent storage device A (430A) begins copying and sending the specified chunks to spare persistent storage device A (440A) [6]. Before persistent storage device A (430A) completes copying and sending chunks to spare persistent storage device A (440A), persistent storage device A (430A) fails [7].

In response to the failure of persistent storage device A (430A), the data processor (412) identifies rebuilding chunks needed to rebuild the remaining chunks not copied to spare persistent storage device A (440A) during the proactive copy operation [8]. The data processor (412) then sends requests to the persistent storage devices (430D and 430G) of data node B (420B) and data node C (420C) that include chunks required to rebuild the rebuilding chunks to copy and send to spare persistent storage device A (440A) [9]. In response to the requests, persistent storage device D (430D) and persistent storage device G (430G) copy and send the required chunks to spare persistent storage device A (440A). After receiving the required chunks, spare persistent storage device A (440A) rebuilds the rebuilding chunks to complete the rebuilding of persistent storage device A (430A) [11].

Figure 4C:
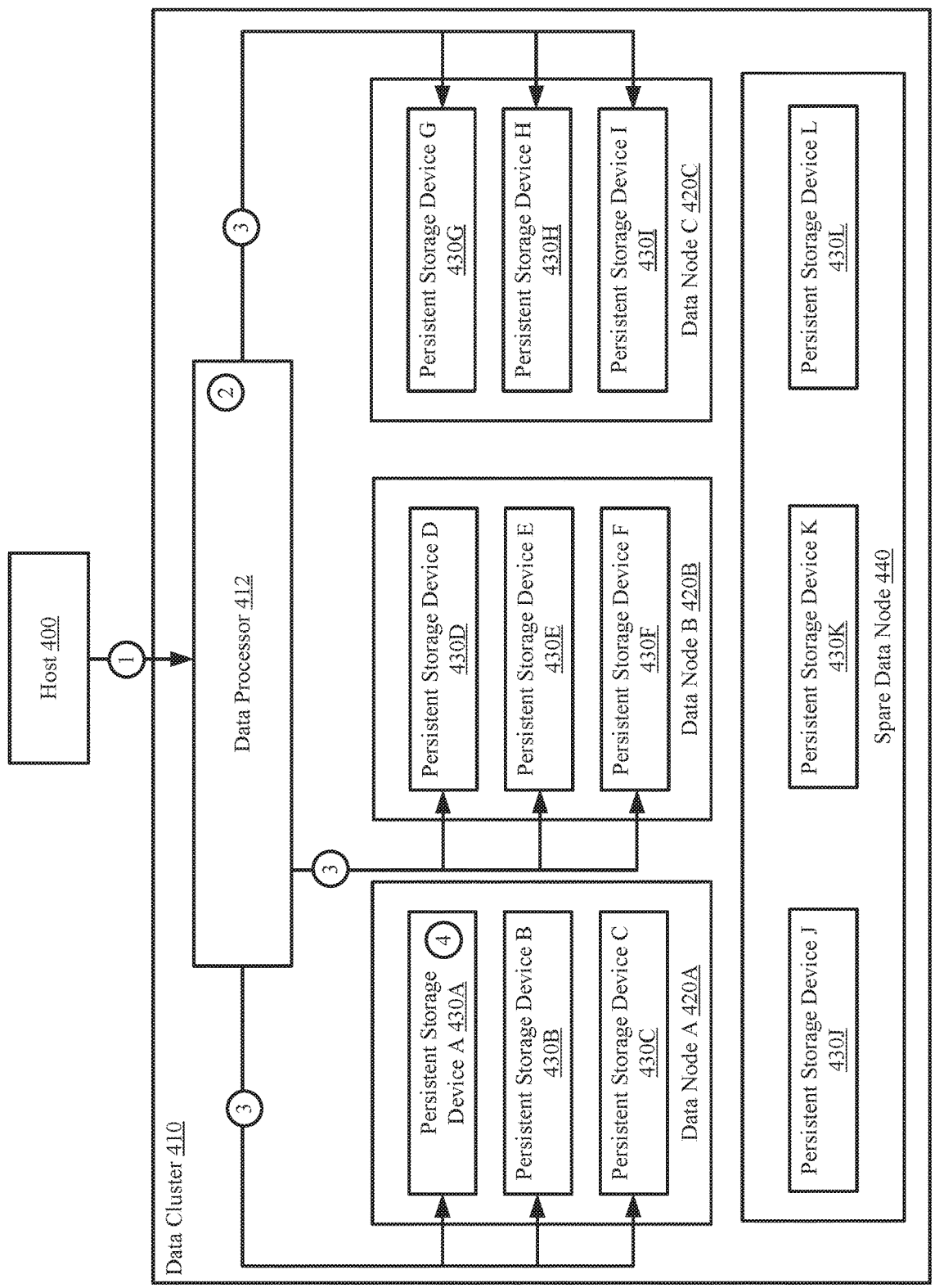
FIGS. 4C-4D show a second example in accordance with one or more embodiments of the invention.
Figure 4D:
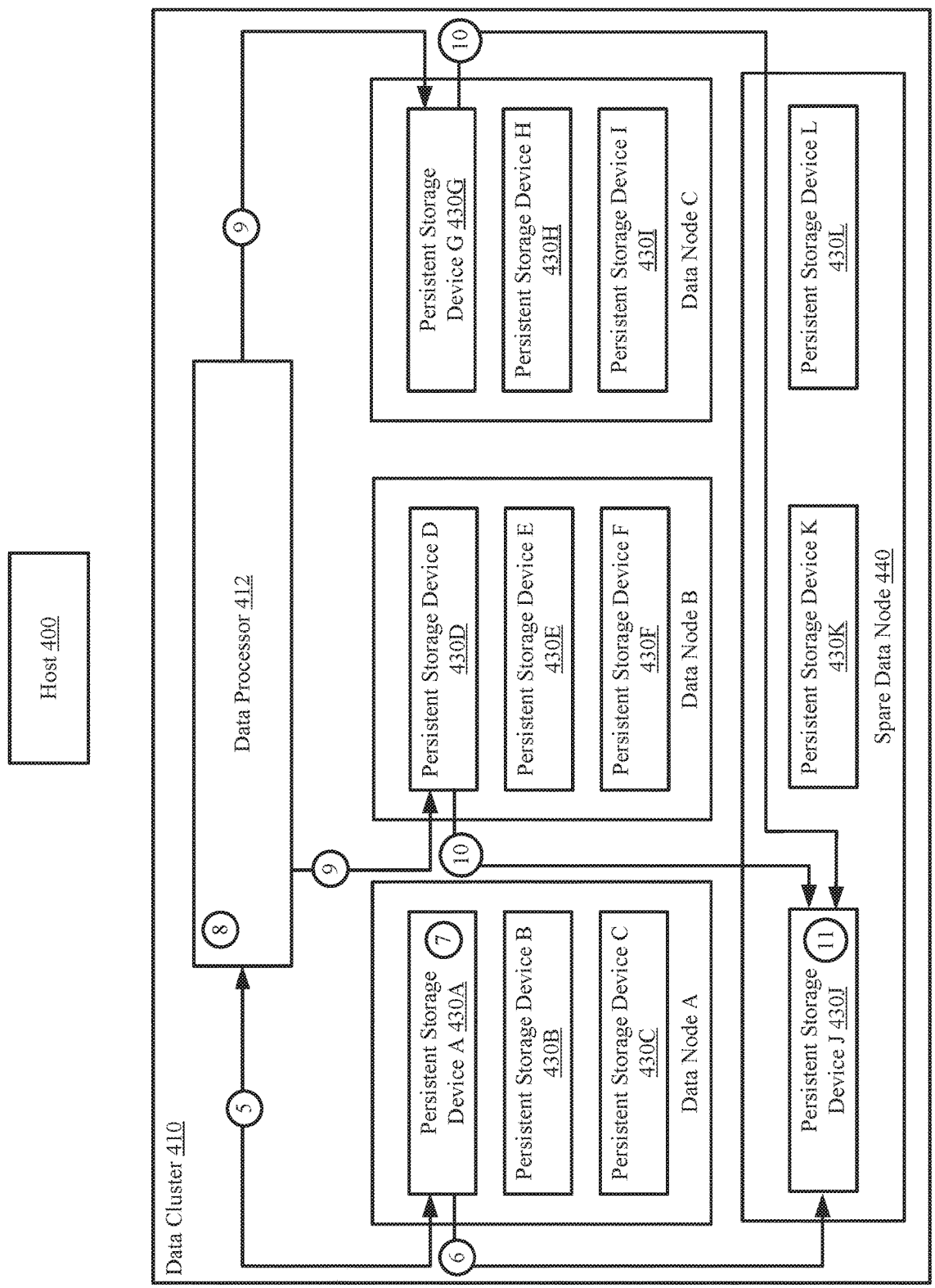

FIGS. 4C-4D show a second example in accordance with one or more embodiments of the invention. Turning to the second example, consider a scenario in which a data cluster obtains data from a host. The data is a file. The host requests the file to be stored in the data cluster using a 2:1 erasure coding procedure. FIG. 4C shows a diagram of a second example system in accordance with one or more embodiments of the invention. The host (400) sends the request to a data processor (412) of a data cluster (410) [1]. The data processor (412) performs an erasure coding on the file, breaking the file into data and parity chunks (not shown), resulting in three sets of data slices [2]. The data processor (412) then sends the chunks to each of the data nodes (420A, 420B, 420C) in which they are stored [3].

More specifically, the chunks of the first set of data slices (not shown) are stored in persistent storage device A (430A) of Data node A (420A), persistent storage device D (430D) of data node B (420B), and persistent storage device G (430G) of data node C (420C). The chunks of the second set of data slices are stored in persistent storage device B (430B) of data node A (420A), persistent storage device E (430E) of data node B (420B), and persistent storage device H (430H) of data node C (420C). The chunks of the third set of data slices are stored in persistent storage device C (430C) of data node A (420A), persistent storage device F (430F) of data node B (420B), and persistent storage device I (4301) of data node C (420C). After the chunks are stored in the data nodes, the health monitor of persistent storage device A (430A) detects a potential failure within persistent storage device A (430A) [4].

FIG. 4D shows an example of the methods depicted in FIG. 3B and FIG. 3C. Continuing with the second example, persistent storage device A (430A) then notifies the data processor (412) of a potential failure, and, in response, the data processor (412) sends a request initiating a proactive copy operation (the method depicted in FIG. 3B) [5]. The request includes the data and/or parity chunks to be copied and sent to persistent storage device J (430J) of the spare data node (440). After receiving the request, persistent storage device A (430A) begins copying and sending the specified chunks to persistent storage device J (430J) of the spare data node (444) [6]. Before persistent storage device A (430A) completes copying and sending chunks to persistent storage device J (430J) of the spare data node (440), persistent storage device A (430A) fails [7].

In response to the failure of persistent storage device A (430A), the data processor (412) identifies rebuilding chunks needed to rebuild the remaining chunks not copied to persistent storage device J (430J) of the spare data node (440) during the proactive copy operation [8]. The data processor (412) then sends requests to the persistent storage devices (430D and 430G) of data node B (420B) and data node C (420C) that include chunks required to rebuild the rebuilding chunks to copy and send to persistent storage device J (430J) of the spare data node (440) [9]. In response to the requests, persistent storage device D (430D) and persistent storage device G (430G) copy and send the required chunks to persistent storage device J (430J) of the spare data node (440) [10]. After receiving the required chunks, persistent storage device J (430J) of the spare data node (440) rebuilds the rebuilding chunks to complete the rebuilding of persistent storage device A (430A) [11].

End of Example

As discussed above, embodiments of the invention may be implemented using computing devices. FIG. 5 shows a computing system in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the reliability of storing data and the efficiency of rebuilding data in a data cluster. In one embodiment of the invention, the reliability and efficiency is improved by performing proactive copy operations in a manner that copies and sends data of a potentially failing persistent storage device of a data node to a spare location of a data cluster in the background of data storage operations with minimal impact on the performance of the data storage operations of the data cluster. The spare location may be a spare persistent storage device within a data node or a persistent storage device of a spare data node. More specifically, one or more persistent storage devices may include a health monitor. In these scenarios, the health monitor includes functionality to detect when persistent storage (or a portion thereof) in a persistent storage device may fail. In the event of a potential persistent storage device failure is detected, a proactive copy operation is performed. The proactive copy operation enables a spare location to obtain data from a potentially failing persistent storage device before the potentially failing persistent storage device fails. Upon failure of the potentially failing persistent storage device, the spare location uses the previously obtained data to rebuild or replace, at least a portion of, the failed persistent storage device.

In traditional data clusters, after a persistent storage device failure, a spare persistent storage device obtains associated data from healthy persistent storage devices in the data cluster and must use the obtained data to rebuild the entirety of the data that was stored on the failed persistent storage device. Embodiments of the invention improve the traditional data clusters by preemptively copying data from a potentially failing persistent storage device to a spare location prior to a persistent storage device failure via proactive copy operations. As a result, the latency and computational efficiency required to rebuild a failed persistent storage device on a spare location in a data cluster are improved.

Thus, embodiments of the invention may address the problem of inefficient use of computing resources. This problem arises due to the technological nature of the environment in which data is stored.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described with respect to a limited number of embodiments, those skilled in the art, having benefit of this disclosure, will appreciate that other embodiments can be devised which do not depart from the scope of the technology as disclosed herein. Accordingly, the scope of the invention should be limited only by the attached claims.

What is claimed is:

1. A method for managing data, the method comprising:
   detecting, by a data processor, a failure of a persistent storage device in a data node of a plurality of data nodes; and
   in response to the detecting, initiating, by the data processor, a rebuilding of data in a spare location using proactive copy metadata and slice metadata, wherein the data is a copy of data that was stored in the persistent storage device;
   prior to detecting the failure of the persistent storage device in the data node of the plurality of data nodes:
      detecting a potential failure of the persistent storage device; wherein detecting the potential failure of the persistent storage device comprises:
      monitoring, by a health monitor associated with the persistent storage device, threshold values of attributes associated with the persistent storage device that indicate reliability of the persistent storage device;
      making a determination, based on the monitoring and by the health monitor, of the potential failure of the persistent storage device; and
      in response to the determination by the health monitor:
         obtaining, by the data processor, a notification indicating the potential failure of the persistent storage device from the health monitor; and
         in response to detecting the potential failure of the persistent storage device:
            initiating, by the data processor, writing of proactive copy data to the spare location.

2. The method of claim 1, wherein the spare location is a spare persistent storage device in the data node.

3. The method of claim 1, wherein the spare location is a spare persistent storage device in a spare data node, wherein the spare data node is not one of the plurality of data nodes.

4. The method of claim 1, wherein the proactive copy data comprises a copy of at least a portion of the data on the persistent storage device.

5. The method of claim 4, wherein the proactive copy metadata is based on the proactive copy data.

6. The method of claim 4, wherein the proactive copy data comprises at least one data chunk and at least one parity chunk.

7. A system, comprising:
   a processor;
   a data processor, which when executed by the processor performs a method, the method comprising:
      detecting, by the data processor, a failure of a persistent storage device in a data node of a plurality of data nodes; and
      in response to the detecting, initiating, by the data processor, a rebuilding of data in a spare location using proactive copy metadata and slice metadata, wherein the data is a copy of data that was stored in the persistent storage device;
      prior to detecting the failure of the persistent storage device in the data node of the plurality of data nodes:
         detecting a potential failure of the persistent storage device; wherein detecting the potential failure of the persistent storage device comprises:
         monitoring, by a health monitor associated with the persistent storage device, threshold values of attributes associated with the persistent storage device that indicate reliability of the persistent storage device;
         making a determination, based on the monitoring and by the health monitor, of the potential failure of the persistent storage device; and
         in response to the determination by the health monitor:
            obtaining, by the data processor, a notification indicating the potential failure of the persistent storage device from the health monitor; and
            in response to detecting the potential failure of the persistent storage device:
               initiating, by the data processor, writing of proactive copy data to the spare location.

8. The system of claim 7, wherein the spare location is a spare persistent storage device in the data node.

9. The system of claim 7, wherein the spare location is a spare persistent storage device in a spare data node, wherein the spare data node is not one of the plurality of data nodes.

10. The system of claim 7, wherein the proactive copy data comprises a copy of at least a portion of the data on the persistent storage device.

11. The system of claim 10, wherein the proactive copy metadata is based on the proactive copy data.

12. The system of claim 10, wherein the proactive copy data comprises at least one data chunk and at least one parity chunk.

13. A non-transitory computer readable medium comprising computer readable program code, which when executed by a computer processor enables the computer processor to perform a method, the method comprising:
    detecting, by a data processor, a failure of a persistent storage device in a data node of a plurality of data nodes; and
    in response to the detecting, initiating, by the data processor, a rebuilding of data in a spare location using proactive copy metadata and slice metadata, wherein the data is a copy of data that was stored in the persistent storage device;
    prior to detecting the failure of the persistent storage device in the data node of the plurality of data nodes:
       detecting a potential failure of the persistent storage device; wherein detecting the potential failure of the persistent storage device comprises:
       monitoring, by a health monitor associated with the persistent storage device, threshold values of attributes associated with the persistent storage device that indicate reliability of the persistent storage device;
       making a determination, based on the monitoring and by the health monitor, of the potential failure of the persistent storage device; and
       in response to the determination by the health monitor:
          obtaining, by the data processor, a notification indicating the potential failure of the persistent storage device from the health monitor; and
          in response to detecting the potential failure of the persistent storage device:

initiating, by the data processor, writing of proactive copy data to the spare location.

14. The non-transitory computer readable medium of claim 13, wherein the spare location is a spare persistent storage device in the data node.

15. The non-transitory computer readable medium of claim 13, wherein the spare location is a spare persistent storage device in a spare data node, wherein the spare data node is not one of the plurality of data nodes.

16. The non-transitory computer readable medium of claim 13, wherein the proactive copy data comprises a copy of at least a portion of the data on the persistent storage device.

17. The non-transitory computer readable medium of claim 16, wherein the proactive copy metadata is based on the proactive copy data.

* * * * *